(12) United States Patent
Kenny et al.

(10) Patent No.: US 9,240,729 B2
(45) Date of Patent: Jan. 19, 2016

(54) RESONANT CONVERTER FOR ACHIEVING LOW COMMON-MODE NOISE, ALONG WITH ISOLATED POWER SUPPLY AND METHOD EMPLOYING THE SAME

(75) Inventors: John F. Kenny, Budd Lake, NJ (US); Joe E. Marriott, Loveland, CO (US); Katherine Mueller, Budd Lake, NJ (US); Michael J. Benes, Budd Lake, NJ (US); Daniel Miller, Windsor, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1682 days.

(21) Appl. No.: 12/495,770

(22) Filed: Jun. 30, 2009

(65) Prior Publication Data

US 2010/0328974 A1    Dec. 30, 2010

(51) Int. Cl.
*H02M 7/5383* (2007.01)
*H02M 3/337* (2006.01)
*H02M 7/48* (2007.01)
*H02M 1/12* (2006.01)
*H02M 7/5387* (2007.01)
*H02M 1/00* (2007.01)

(52) U.S. Cl.
CPC .... *H02M 3/3376* (2013.01); *H02M 2001/0058* (2013.01); *H02M 2001/123* (2013.01); *H02M 2007/4815* (2013.01); *H02M 2007/53878* (2013.01); *Y02B 70/1433* (2013.01); *Y02B 70/1441* (2013.01); *Y02B 70/1491* (2013.01)

(58) Field of Classification Search
CPC ................................................ H02M 2001/123
USPC ............... 363/20, 21.02, 21.03, 21.07, 21.08, 363/21.15, 21.16, 44–48, 53, 127, 17, 40, 363/41, 43, 55, 56.02, 15, 16, 19
See application file for complete search history.

(56) References Cited

U.S. PATENT DOCUMENTS

| | | | | |
|---|---|---|---|---|
| 3,743,861 | A * | 7/1973 | Bolmgren | 327/459 |
| 4,477,868 | A * | 10/1984 | Steigerwald | 363/28 |
| 5,208,738 | A * | 5/1993 | Jain | 363/17 |
| 5,550,697 | A * | 8/1996 | Green et al. | 361/18 |
| 5,559,688 | A * | 9/1996 | Pringle | 363/89 |
| 6,239,557 | B1 * | 5/2001 | Chang et al. | 315/278 |
| 6,246,599 | B1 * | 6/2001 | Jang et al. | 363/132 |
| 6,356,462 | B1 * | 3/2002 | Jang et al. | 363/17 |
| 6,366,474 | B1 * | 4/2002 | Gucyski | 363/20 |
| 6,466,460 | B1 * | 10/2002 | Rein et al. | 363/21.02 |
| 7,030,689 | B2 | 4/2006 | Leenerts et al. | |
| 7,145,786 | B2 * | 12/2006 | Vinciarelli | 363/17 |
| 7,286,373 | B1 * | 10/2007 | Liu et al. | 363/16 |
| 7,382,636 | B2 * | 6/2008 | Baarman et al. | 363/97 |
| 7,706,161 | B2 * | 4/2010 | Quazi | 363/89 |
| 2002/0071301 | A1* | 6/2002 | Kinghorn | 363/125 |
| 2007/0253135 | A1* | 11/2007 | Bovitz | 361/118 |
| 2008/0278985 | A1* | 11/2008 | Ribarich | 363/127 |

* cited by examiner

*Primary Examiner* — Harry Behm

(57) ABSTRACT

Embodiments are described for reducing common-mode current in electronic devices. In the various embodiments, a resonant converter is employed, for example in a power supply, and the resonant converter is driven by a DC input to generate an AC primary voltage on the primary windings of a power transformer. The DC input may be derived from an AC line voltage or a DC-to-DC converter. The AC primary voltage drives the primary winding of the transformer to generate an AC secondary voltage on at least one secondary winding of the transformer. The AC secondary voltage may then drive a rectifier, which in turn drives a low-pass filter to produce a DC output voltage. Phase-shift modulation is employed which, in conjunction with the resonant converter, applies a sinusoidal waveform to the primary of the transformer resulting in a reduced amount of common-mode current injected onto the secondary.

13 Claims, 12 Drawing Sheets

US 9,240,729 B2

RESONANT CONVERTER FOR ACHIEVING LOW COMMON-MODE NOISE, ALONG WITH ISOLATED POWER SUPPLY AND METHOD EMPLOYING THE SAME

FIELD

The present disclosure relates generally to power converters and, more particularly, to a resonant converter with low common-mode noise generation.

BACKGROUND

For a variety of consumer and commercial applications, electronic equipment requires that power be provisioned through alternating current (AC) power lines, such as the standard 60 Hz power lines in the United States. These AC power lines are typically referenced to earth ground. Power supplies are employed to convert input AC voltages to desired level(s) of direct current (DC) voltage needed by the internal components of the electronic equipment. Equipment often requires DC isolation between portions of their resident circuitry and earth ground for proper circuit operation and user safety, and power supplies generally provide such isolation.

Ideally, an isolated power supply should accept a wide range of AC power line voltages while producing a stable, constant DC voltage. Preferably, this capability is performed with essentially no power loss, and without producing any undesirable side effects that adversely impact the performance of the associated equipment. One such side effect commonly produced by power supplies is injected current, also referred to as common-mode AC current, that is induced in the DC outputs of a power supply due to coupling between the isolated and non-isolated portions of the supply. Typically, inter-winding capacitance in a power transformer within the power supply provides the major source of such coupling. High frequency applications, in particular, present problems in the design of transformers with reduced winding capacitance.

The injected current produced depends to some degree on the magnitude of the inter-winding capacitance and the magnitude, primary frequency, and harmonic content of the driving voltage applied at the terminals of the primary winding of the transformer. Winding capacitance can be separated into four categories: (1) capacitance between turns; (2) capacitance between layers; (3) capacitance between windings; and (4) stray capacitance, i.e., capacitance between the winding next to the core and the outer winding next to the adjacent circuitry.

A traditional isolated power supply 100, as shown in FIG. 1, normally exhibits some level of injected current. An AC line voltage $V_{ACL}$, drives the primary windings of a power isolation transformer 110, thereby inducing a smaller AC voltage $V_{ACT}$ in the transformer secondary windings. This voltage then drives a rectifier 120, which converts the smaller AC voltage $V_{ACT}$ into a half-wave or full-wave rectified voltage $V_{ACR}$. A low-pass filter 130 then converts the rectified voltage $V_{ACR}$ into a DC voltage $V_{DCR}$ exhibiting some small AC "ripple." In some cases, a voltage regulator 140 is then employed to generate a DC output voltage $V_{DCO}$ with reduced AC ripple, while also providing some DC voltage level stability against amplitude changes in the AC line voltage $V_{ACL}$.

Usually, the rather high amplitude of the AC line voltage $V_{ACL}$ produces a high level of injected current by way of the aforementioned inter-winding capacitance of the power transformer 110. Capacitance between the layers of the primary and secondary windings of the transformer contribute most to the overall capacitance, while winding-to-winding capacitance and stray capacitance perhaps contribute most to common-mode noise and circuit instability. In order to mitigate against this, special winding techniques, such as balanced windings, and electrostatic shielding are employed to reduce the capacitance, but at the expense of a more costly transformer.

In addition to the above, the traditional power supply 100 normally exhibits low power efficiency. This characteristic is caused by a relatively low transformer primary-to-secondary winding ratio to ensure that the smaller AC voltage $V_{ACT}$ is of a sufficiently high magnitude when the AC line voltage $V_{ACT}$, is at a minimum. Therefore, when the AC line voltage $V_{ACT}$, is higher than its minimum, the smaller AC voltage $V_{ACT}$ is higher than necessary to provide the required DC output voltage $V_{DCO}$, resulting in higher power dissipation, sometimes resulting in power efficiency as low as 50%, or less.

Furthermore, in order to produce the same DC voltage for a wide range of AC line voltages $V_{ACL}$, the transformer 110 often employs multiple windings and taps to allow different AC line voltages $V_{ACL}$, to produce the same DC output voltage $V_{DCO}$. The tap to be used in a particular circumstance is selected by way of a user-settable switch. While such a design lends flexibility with respect to the various AC power line voltages with which the associated equipment may be used, increased hardware costs and possible equipment damage result due to an incorrect switch setting.

To address this drawback, a switch-mode DC-to-DC converter 200, as displayed in FIG. 2, may be employed as part of a larger power supply. First, an AC power line voltage (not shown) is converted to a relatively high DC input voltage $V_{DCI}$ by way of rectifiers and filter capacitors (also not shown), typically by way of a line voltage selector switch. The DC input voltage $V_{DCI}$ is then quickly switched ON and OFF intermittently via an electronic switch circuit 210 (typically comprising a set of transistors), resulting in a switched DC voltage $V_{DCS}$. The switched voltage $V_{DCS}$, alternating between the magnitude of the DC input voltage $V_{DCI}$ and zero volts (or the "open" state) is then applied to the primary winding of an isolation transformer 230 to generate a transformed DC switched signal $V_{DCT}$ at the secondary winding. This voltage is then rectified by a rectifier 240 to produce a rectified voltage $V_R$, which may then be passed to a low-pass filter 250 to reduce any AC components of that voltage $V_R$, thus resulting in a final DC output voltage $V_{DCO}$.

The magnitude of the DC output voltage $V_{DCO}$ is influenced primarily by the operation of the electronic switch circuit 210, which is managed by a control circuit 220. More specifically, the higher the duty cycle of the switches (i.e., the longer they are in the closed or ON state), the higher the DC output voltage $V_{DCO}$. Thus, the control circuit 220 monitors the DC output voltage $V_{DCO}$ to adjust the duty cycle properly, often through an isolation circuit 260 to maintain galvanic isolation between the AC input power line and the output of the DC-to-DC converter 200.

Many such converters 200 available today can tolerate a wide range of DC power line voltages without the need for multiple taps or a switch. Power supplies that utilize such a converter 200 are termed "universal-input" power supplies.

Another advantage of such a design is that the use of an electronic switch circuit 210 results in the transistors involved transitioning into either the ON (saturated) or OFF (non-conducting) state very quickly, resulting in very little power loss, making the DC-to-DC converter 200 quite efficient. However, this design also results substantially in a square wave for the switched DC voltage $V_{DCS}$ being applied directly to the transformer. Such a signal possesses a strong harmonic content at high frequencies, thus producing a significant amount of injected current into the non-isolated portion of the converter 200. Also, to allow the use of a smaller transformer and other components, the control circuit 220 typically drives the switches at a much higher frequency (e.g., 20 kilohertz (kHz) to a few megahertz (MHz)) than that of an AC power line. Unfortunately, such high frequencies easily couple though the inter-winding capacitance of the transformer 230, therefore augmenting the injected current produced. Additionally, the fact that the magnitude of the switched DC voltage $V_{DCS}$ is relatively high further exacerbates this phenomenon. The resulting square-wave switched DC voltage signal that drives the primary of the transformer produces fast changes in voltages on the transformer and possess harmonic content at high frequencies, unfortunately injecting high common-mode current through the primary to secondary capacitances of the transformer. To eliminate this requires common-mode chokes on the secondary, which depending on the number of desired taps, can be complex and expensive. Capacitors to ground on the secondary would also be necessary to filter the common-mode noise that is generated, thereby compromising isolation.

One attractive approach for combating this is described in U.S. Pat. No. 7,030,689, issued Apr. 18, 2006 to the assignee of the present application. Here, the output of a class-D amplifier is low-pass filtered to drive the primary of the transformer with a sinusoidal waveform. However, readily available class-D amplifiers used in audio applications operate at relatively low frequencies, resulting in larger components, and the frequency of the signal driving the class-D amplifier is typically at least four times the frequency of the waveform on the transformer. Therefore, to increase the frequency of the transformer waveform (and decrease the size of components) entails switching at four times the frequency.

Another approach involves the use of a 60 Hz square-wave DC-DC converter to generate low common-mode current due to the low frequency of operation. The low frequency, however, necessarily results in very large components. Yet another approach is to cancel the common-mode current by creating an equal and opposite current to cancel the common-mode current generated by the circuit. This approach, however, requires calibration and adds parts and complexity.

Due to the drawbacks associated with existing approaches, a need therefore remains for an approved reduction in common-mode current in such applications.

SUMMARY

Embodiments are described for reducing common-mode current in electronic devices. In the various embodiments, a resonant converter is employed, for example in a power supply, and the resonant converter is driven by a DC input to generate an AC primary voltage on the primary windings of a power transformer. The DC input may be derived from an AC line voltage or a DC-to-DC converter. The AC primary voltage drives the primary winding of the transformer to generate an AC secondary voltage on at least one secondary winding of the transformer. The AC secondary voltage may then drive a rectifier, which in turn drives a low-pass filter to produce a DC output voltage. Phase-shift modulation is employed which, in conjunction with the resonant converter, applies a sinusoidal waveform to the primary of the transformer resulting in a reduced amount of common-mode current injected onto the secondary.

DETAILED DESCRIPTION OF THE EXEMPLARY EMBODIMENTS

One possible embodiment of an isolated resonant converter for achieving low common mode current is shown in FIG. 3. Similar to converter 200 of FIG. 2, resonant converter 300 may use a DC input voltage $V_{DCI}$, which may be derived initially from an AC power line source. As discussed above, the AC line voltage may be converted to the DC input voltage $V_{DCI}$ by way of an AC-to-DC voltage converter, typically consisting primarily of rectifiers and filter capacitors, although other means known in the art may also be employed. In a preferred arrangement, $V_{DCI}$ has an amplitude of 48 volts.

Figure 1:
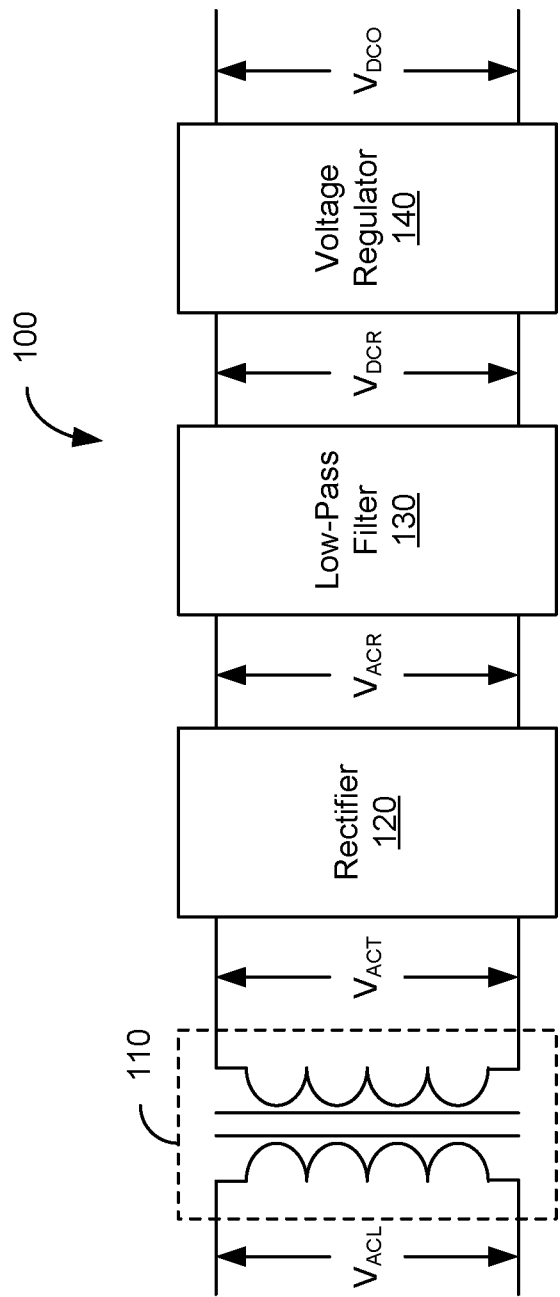
FIG. 1 is a block diagram of a traditional isolated power supply from the prior art.
Figure 2:
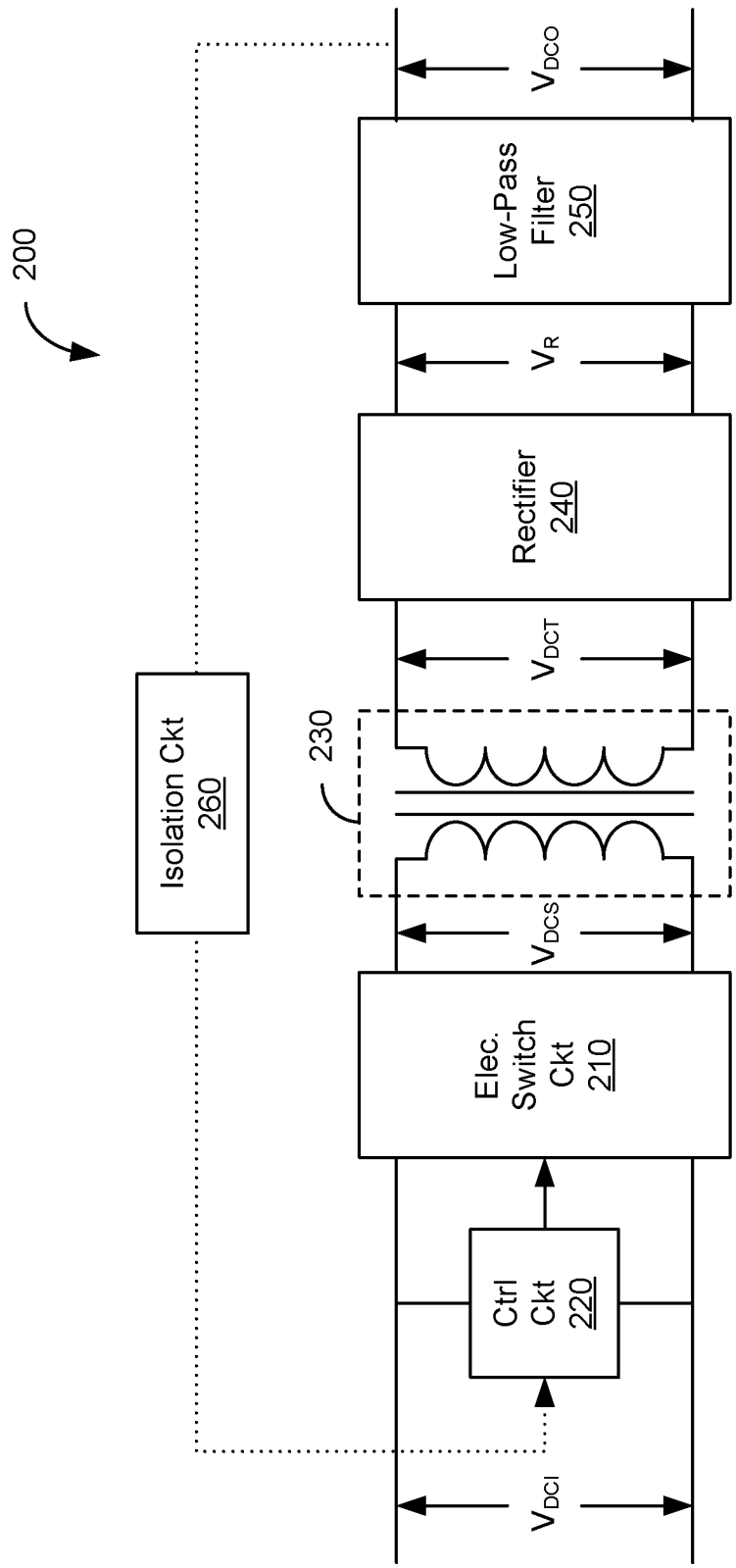
FIG. 2 is a block diagram of an isolated DC-to-DC converter from the prior art.
Figure 3A:
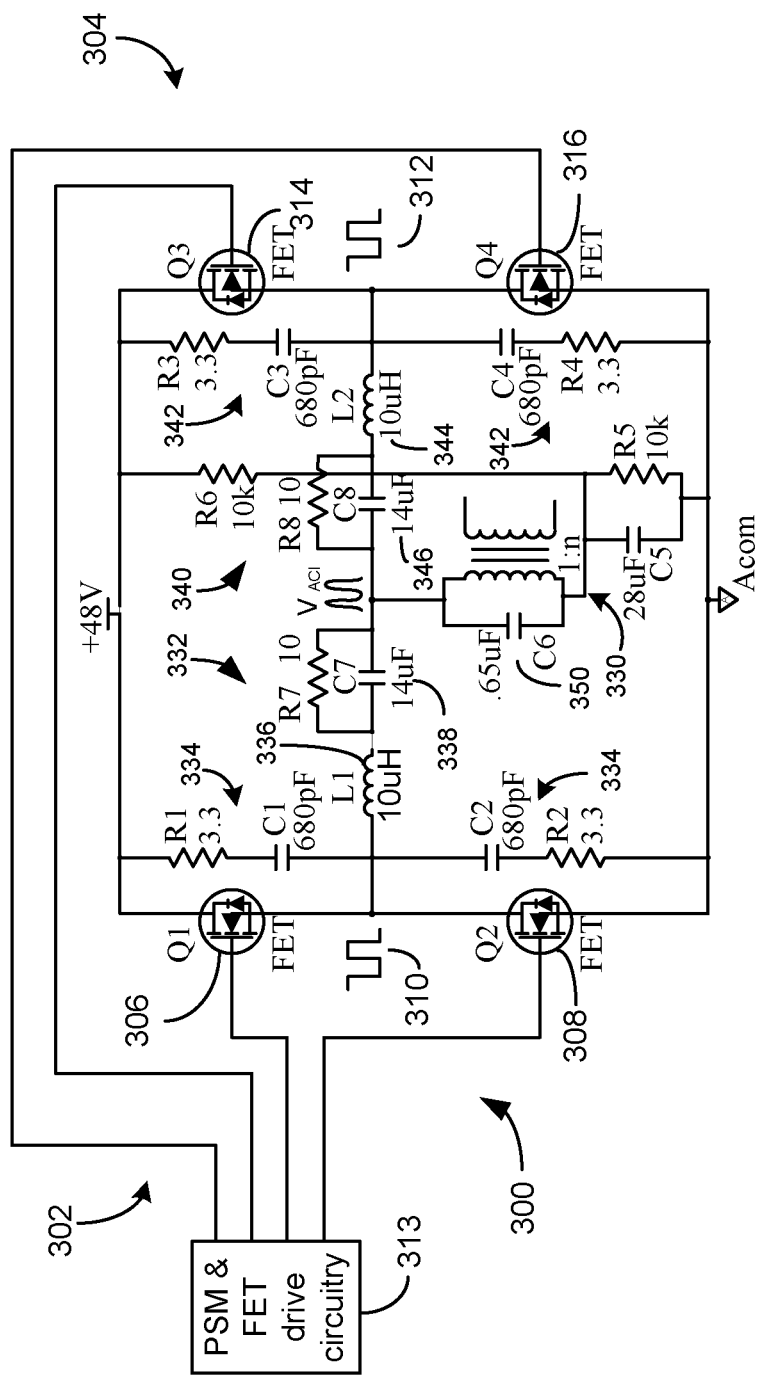
FIG. 3a shows a representative topology for a portion of a circuit, such as a power supply, which incorporates a first embodiment of a resonant converter, and illustrating the circuit portion in a maximum output power condition.
Figure 3B:
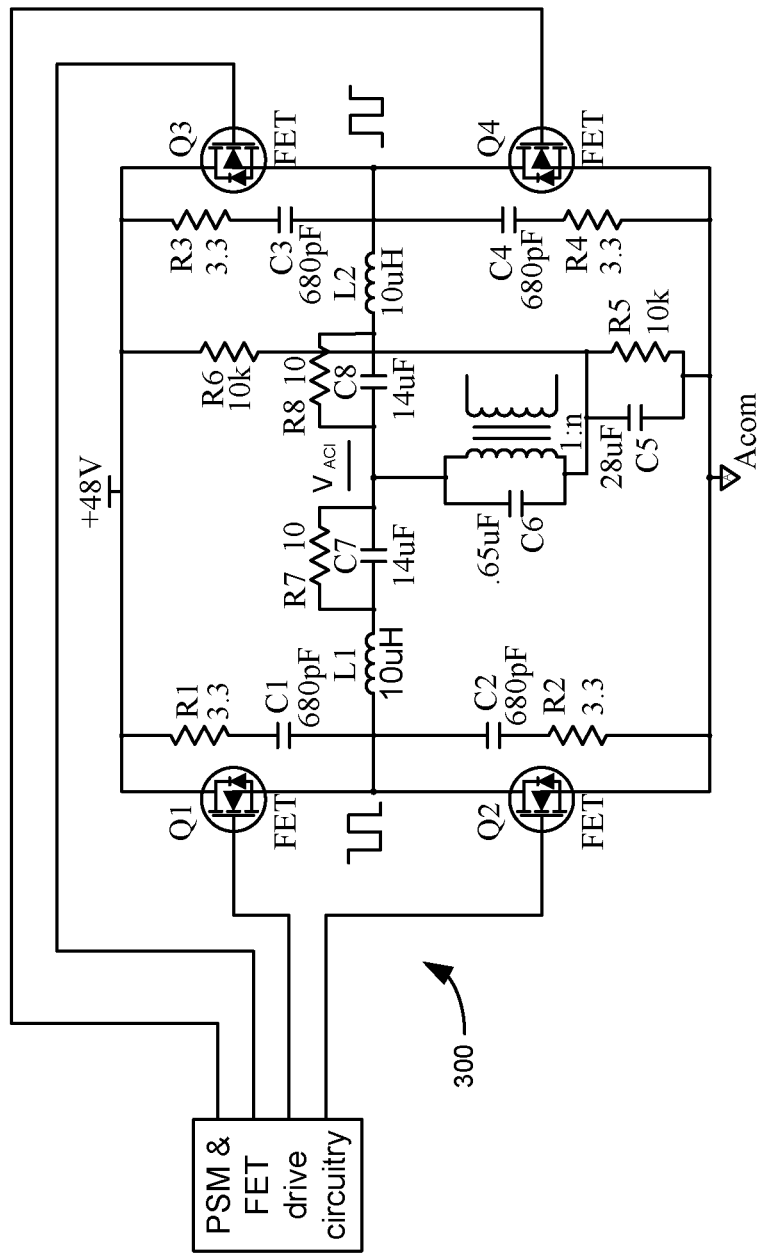
FIG. 3b shows a representative topology for a portion of a circuit, such as a power supply, which incorporates a first embodiment of a resonant converter, and illustrating the circuit portion in a minimum output power condition.

Instead of generating the switched DC voltage $V_{DCS}$ of the converter 200 of FIG. 2, which is essentially a square wave containing significant high-frequency harmonics, and applying it directly to the transformer, an AC primary voltage $V_{ACI}$ with less high-frequency harmonic content is ultimately produced for that purpose. To this end, resonant converter 300 is driven by an input signal source, which may include a phase-shift modulated H-bridge, to apply a sinusoidal waveform with minimal harmonic content to the primary of the transformer. The phase-shift modulated H-bridge may be run at 100 kHz, or any other suitable frequency. The resonant converter 300 is driven by the H-bridge square-wave output and acts as a low-pass filter to eliminate harmonics and high-frequency content, leaving an approximate sinusoidal waveform $V_{ACI}$. Converter 300 effectively behaves as if it is being driven by two half-bridges 302 & 304, each producing a 50% duty cycle, constant amplitude square-wave. Half-bridge 302 may include a pair of FET switches 306 & 308 for generating a first square wave signal 310 from at least a first input signal derived from a first signaling source, preferably a phase shift modulation (PSM) and drive circuitry 313. Similarly, second half-bridge 304 may include an associated pair of FETs 314 & 316 which are driven by the DC input voltage $V_{DCI}$ to generate an associated second square wave signal 318 from at least a second input signal derived from a PSM and drive circuitry 313.

The voltage $V_{ACI}$ applied to the primary windings of transformer 330 is determined by the phases of the two sides 302, 304 of the H-bridge. When the two half-bridge outputs 310, 318 are exactly in phase (FIG. 3a), the maximum voltage $V_{ACI}$ appears on the transformer and the currents from each side sum. When the two half-bridge outputs 310, 318 are exactly out of phase (FIG. 3b), no AC voltage appears on the transformer and the currents cancel each other.

Each side of the isolated resonant converter 300 includes a resonant sub-circuit portion driven by a respective square wave signal. First resonant portion 332 includes associated snubbers 334 to reduce ringing on the FETs, a resonant tank which includes inductor 336, and a DC blocking capacitor 338. Similarly, second resonant side 340 includes associated snubbers 342, a resonant tank which includes inductor 344, and a DC blocking capacitor 346. With phase shift modulation, the two inductors 336, 344 are effectively in parallel. Therefore, the system exhibits only a single resonant frequency regardless of component tolerances. Clamp diodes (not shown) may be used to minimize load on the resonant tanks. One of the benefits of the resonant converter is the resonant capacitor 350 which ties one side of the power transformer, namely the primary, to AC common. This places the primary side in a "quiet" condition so that it doesn't fly up and down with respect to common. Beneficially the primary, thus, doesn't move much at all, while the secondary moves smoothly up and down with the voltage input because the resonant converter filters out the prior harmonics of the square wave resulting in a smoother voltage on the upper side of the primary winding. A relatively large capacitor is preferably employed to stabilize the voltage.

Phase-shift modulation is used to vary the amplitude of the resonant tank output based on feedback signaling. Using phase-shift modulation also ensures control of the voltage applied to the resonant filter at all times. Operating the FET switches at a frequency above resonance allows for control of the amplitude of the sinusoidal waveform $V_{ACI}$ applied across the primary of the transformer by varying the phase of the switches. Chips are currently available having logic circuits to toggle the switches in such fashion. For example, in a preferred embodiment a phase-shift modulation chip, available as Part No. UCC3895 from Texas Instruments, is employed for the feedback control. In operation, the output voltage signal (e.g., $V_{DCO}$ in FIG. 2) is fed back to an error amplifier which compares the output voltage with a reference voltage. The difference between the two is then scaled, clamped and passed back to the phase-shift modulation chip. The phase shift modulation chip then shifts the FET drives accordingly, based on the error signal. For instance, if the error signal is at a minimum (e.g., 0V) then the two sets of FET signals are exactly in phase. If the error signal is at a max (e.g., ~3V) then the two sides of the H-bridge are shifted to 180 degrees out of phase. Any error voltage in between these, results in an intermediate phase shift.

Applying a sinusoidal waveform to the primary of the transformer significantly reduces the speed of the changes in voltage on the primary-to-secondary capacitance of the transformer, thereby significantly reducing the amount of common mode current injected onto the secondary. This holds true regardless of the number of secondary windings on the transformer, allowing easy realization of multiple low common-mode noise outputs. As a result, no common-mode filtering such as chokes or caps to ground are needed on the secondary, allowing easy generation of many outputs and providing better isolation. In addition, inexpensive and widely available parts may be used for switch-mode DC-to-DC converter control (PWM, FET driver, etc.). Resonance is at a fixed-frequency which is high enough to filter easily and use smaller parts, but low enough to avoid problems with parasitics. Operating at high frequencies allows for a smaller transformer, thus reducing its inner winding capacitance. Also, the use of a fixed-frequency converter produces noise at a known fixed frequency, resulting in easier filtering. Finally, switching losses are very low due to the zero-voltage switching property inherent in resonant converters.

A transformer has also been designed with a goal towards achieving little common mode current. In doing so, it is desirable to keep the capacitance from the primary to the secondary windings as low as possible. Previous solutions for reducing common-mode current involve shielding the primary from the secondary with discrete one turn foil windings forming the shields. These shields do not carry any current and are not used for any signal transmission. By placing two shields (one connected to primary common and one connected to secondary common) in between the winding layers, shielding is achieved because a capacitance results from the primary to the primary shield and the secondary to the secondary shield which isn't grounded. The result is less effective capacitance between the primary and the secondary. This known technique, referred to as a Faraday shield, has the drawbacks of adding at least two additional layers to the size of the transformer and requiring two more exits, translating into additional bulk and complexity.

The improved transformer design described herein uses self-shielding to minimize the voltage difference across the primary-to-secondary capacitance, thus generating very low common-mode current. There are generally two known ways to reduce common mode current that is injected into a transformer's secondary through the transformer capacitance. One approach is to lower the interwinding capacitance from the primary to the secondary on the transformer. Another approach is to minimize the voltage across that capacitance. The present disclosure is directed to this second approach.

Figure 4A:
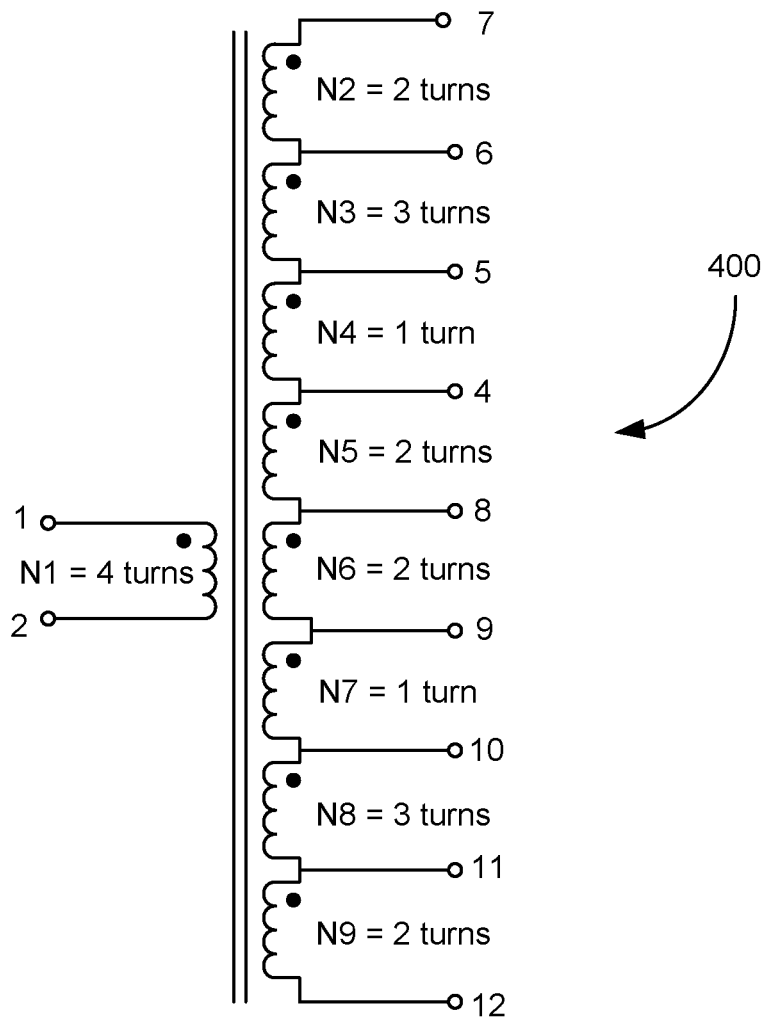
FIG. 4a diagrammatically depicts the primary and secondary exits, along with the number of turns for each winding, of a representative 20V transformer.
Figure 4B:
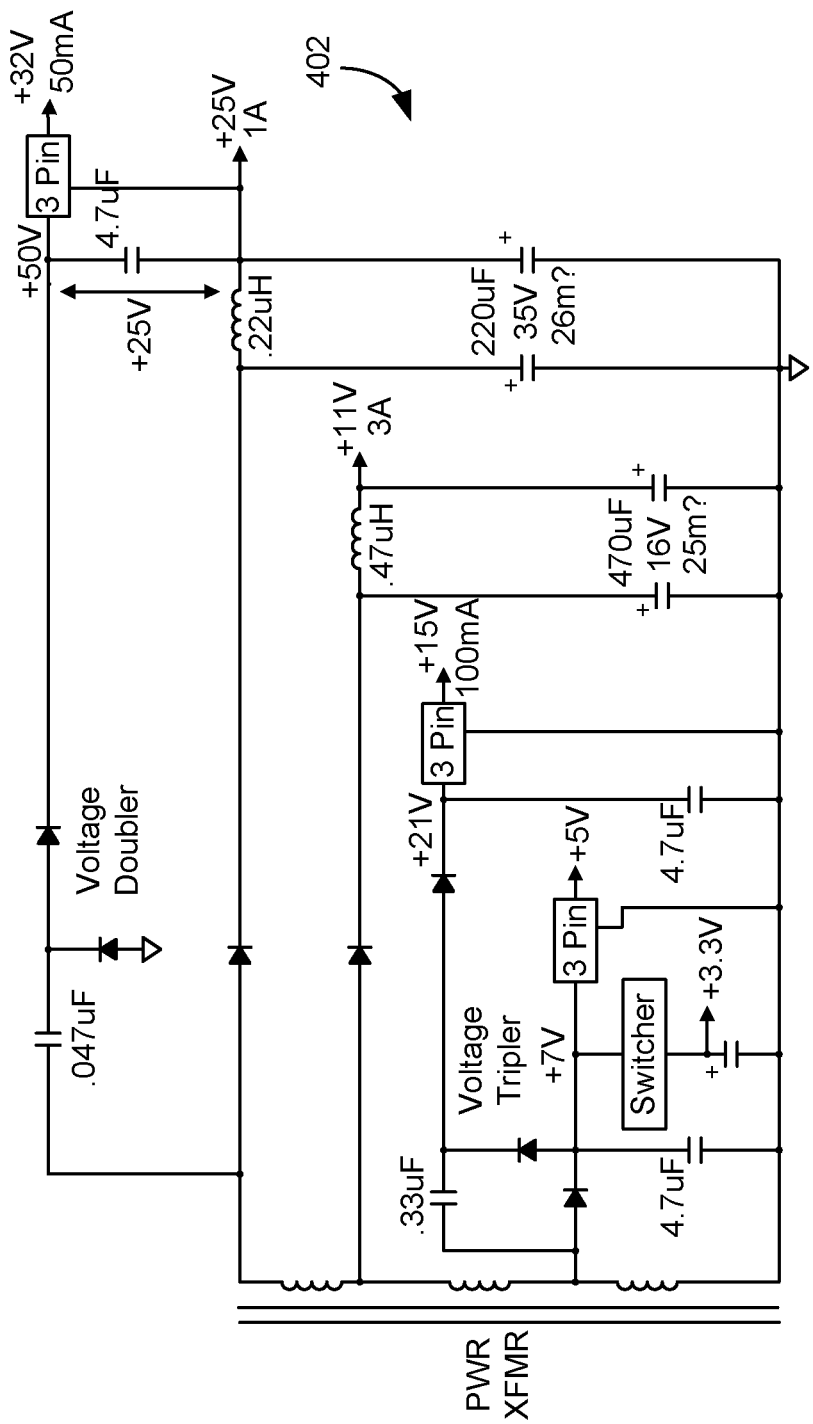
FIG. 4b schematically represents one possible rail/bias schematic for the transformer.

FIG. 4a diagrammatically depicts the primary and secondary for a representative 20V version of a transformer having multiple taps. Such a transformer may be used in the resonant converter described above. FIG. 4a depicts all of the primary and secondary exits along with the number of turns for each winding of representative transformer 400. To achieve self-shielding, foil is used for the windings and the last turn of the inner winding and the first turn of the outer winding are arranged, such that the quiet nodes are aligned. The result is negligible voltage differences across the two windings around the turn. FIG. 4b shows a possible rail/bias schematic 402 for the 20V transformer 400. Here, only positive voltages are shown and drawn half-wave for clarity.

Figure 5A:
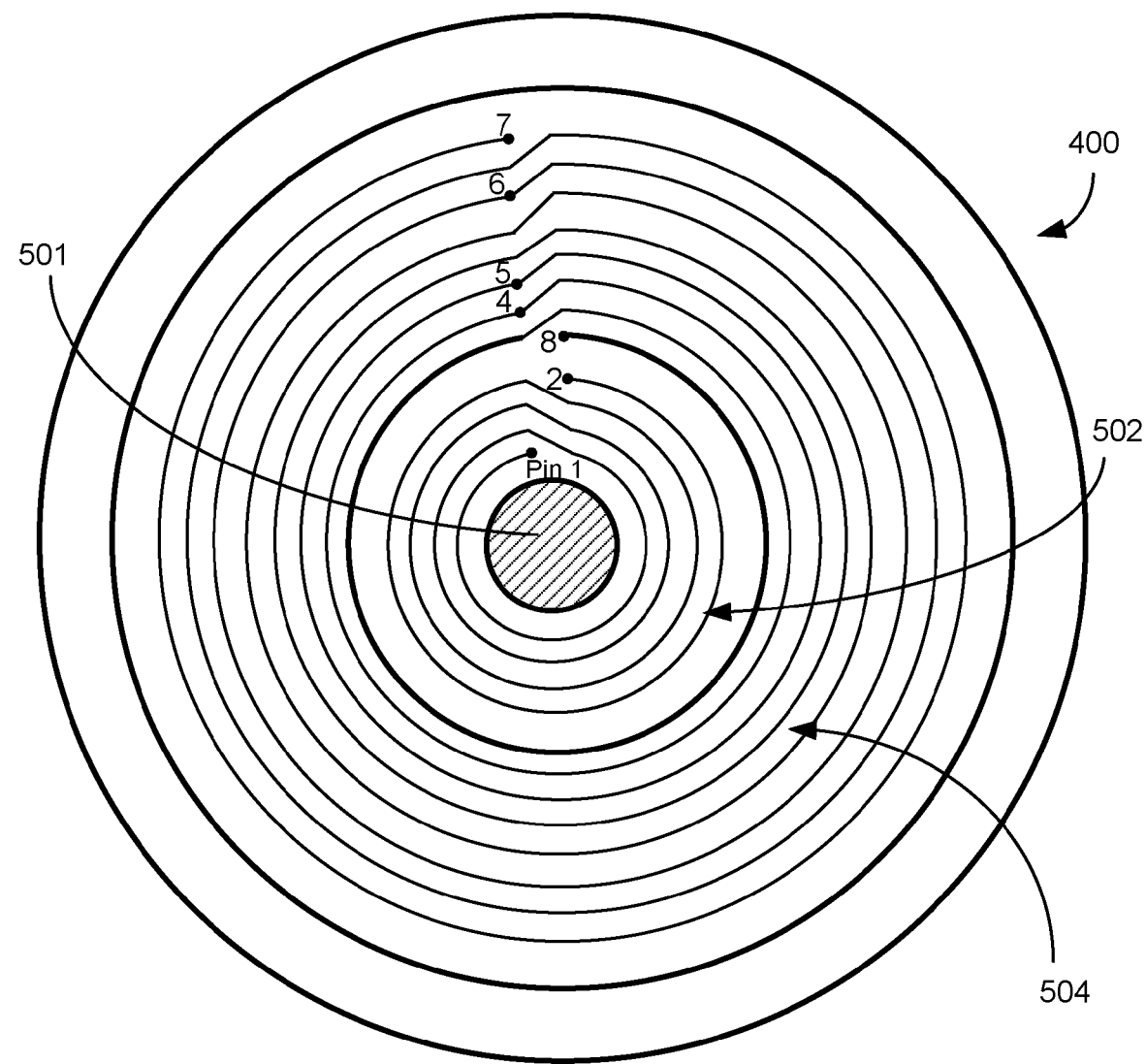
FIG. 5a is an end view in cross-section which diagrammatically illustrates the primary winding and the positive secondary windings for the representative transformer.

The primary foil wrapping, generally 502, is preferably cut to be the usable width "W" of the bobbin 501, as shown in FIG. 5a, in order to achieve complete layers. If wire were used instead, the four turns would only form a fraction of a layer. As also shown in FIG. 5a, the secondary foil wrappings, generally 504, are half the width of the bobbin to allow for better fit and lower leakage.

Figure 5B:
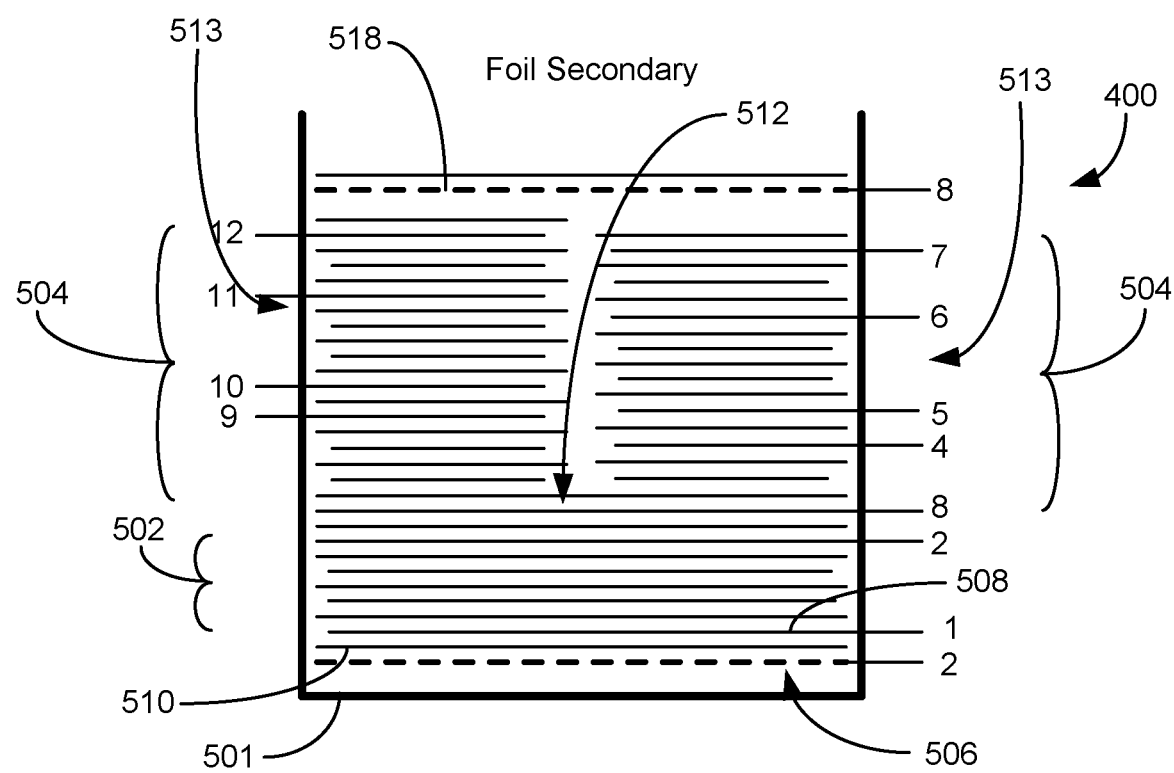
FIG. 5b diagrammatically illustrates the layered windings for the primary and secondary layers of the transformer about a bobbin.
Figure 5C:
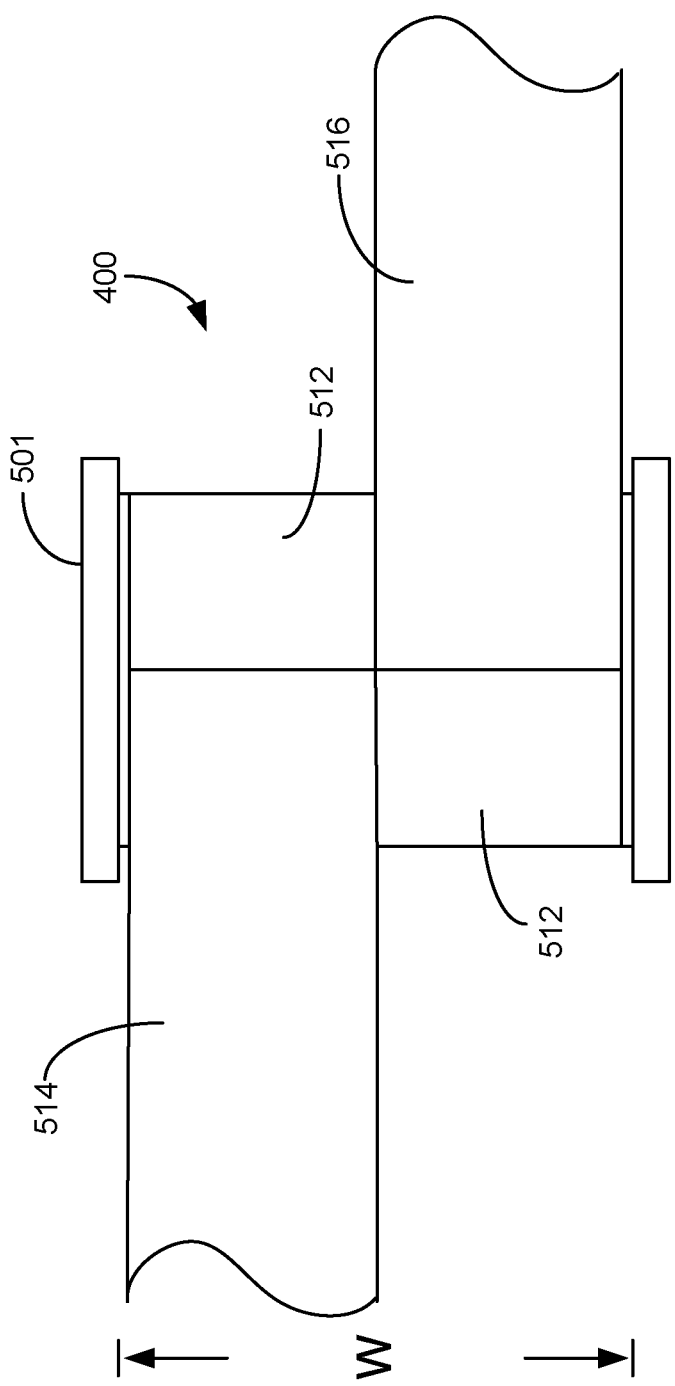
FIG. 5c is a plan view of the shape of the insulated foil for use in the secondary windings.

With references to FIGS. 5a-5c, the inner primary shield 506 of transformer 400 is wound first using one turn of copper foil 508 insulated with tape 510 and connected to pin 2. The primary is then wound with the first turn connected to pin 1 (the input voltage $V_{ACI}$ in FIGS. 3a & b), and the last turn connected to pin 2 (ground). Because this last turn is grounded, it is self-shielding and eliminates the need for an outer primary shield. In order to use this same principle of self-shielding for the secondary, the foil for the secondary is cut out as illustrated in FIG. 5c with one turn 512 the full width "W" of the bobbin and the remaining turns, generally 513, being achieved with wrap segments 514, 516 that are each half the width of the bobbin.

After insulating the primary using a low dielectric tape 512 to reduce the capacitance, the secondary foil, also insulated with tape, is wound from the center out. As such, the full width part of the secondary foil is wound on top of the last turn of the primary. As best depicted in FIG. 5a, the exit to pin 8 is aligned with the primary's exit to pin 2, and the rest of the full-width turn should also align directly on top of the last primary turn to maintain the voltage across the windings as low as possible. It should be noted that FIG. 5a only depicts the positive windings but that the artisan should realize that the negative windings on the other half width of the bobbin would be depicted similarly, albeit wound in a different direction. The two half-width sides 514, 516 of the secondary are wound side-by-side on top of the full width 512 turn in opposite directions. The exits for all the different caps on the secondary are achieved by soldering magnet wire to the foil. The outer secondary shield 518 is then wound with one turn of full-width foil, insulated with yellow tape and connected to pin 8.

With this design construct, pins 2 & 8 become quiet points because they each correspond to common ground, respectively, on the primary and secondary. Since the primary is wound in reverse, as depicted in FIG. 5a, there is little differential voltage across those two adjacent windings and, thus, not much voltage on the interwinding capacitance. This translates into lower injected current. It can be appreciated, then, that it is important that pins 2 & 8 be aligned and not skewed relative to one another to avoid a voltage differential across those pieces of foil all the way around the turn. Because a characteristic of the present design is to ground the first turn adjacent the primary to obtain the shielding effect, it becomes necessary to wind the positive turns in one direction and the negative turns in another direction. This is different from known techniques which have the first turn connected to the negative rail and then wind in a common direction from there, with the turns capped out to ground.

The ordinarily skilled artisan will recognize that the particular parts and materials for the transformer could vary depending on the application at hand. For example, there are a variety of different bobbins and cores available from different manufacturers which might be suitable for different applications. Preferably foil is used for the winding and shields, with the foil being cut to the width of the bobbin window. The windings and shields can be insulated with a suitable tape, and it is preferred to use a low dielectric tape between them to lower the capacitance.

Figure 6:
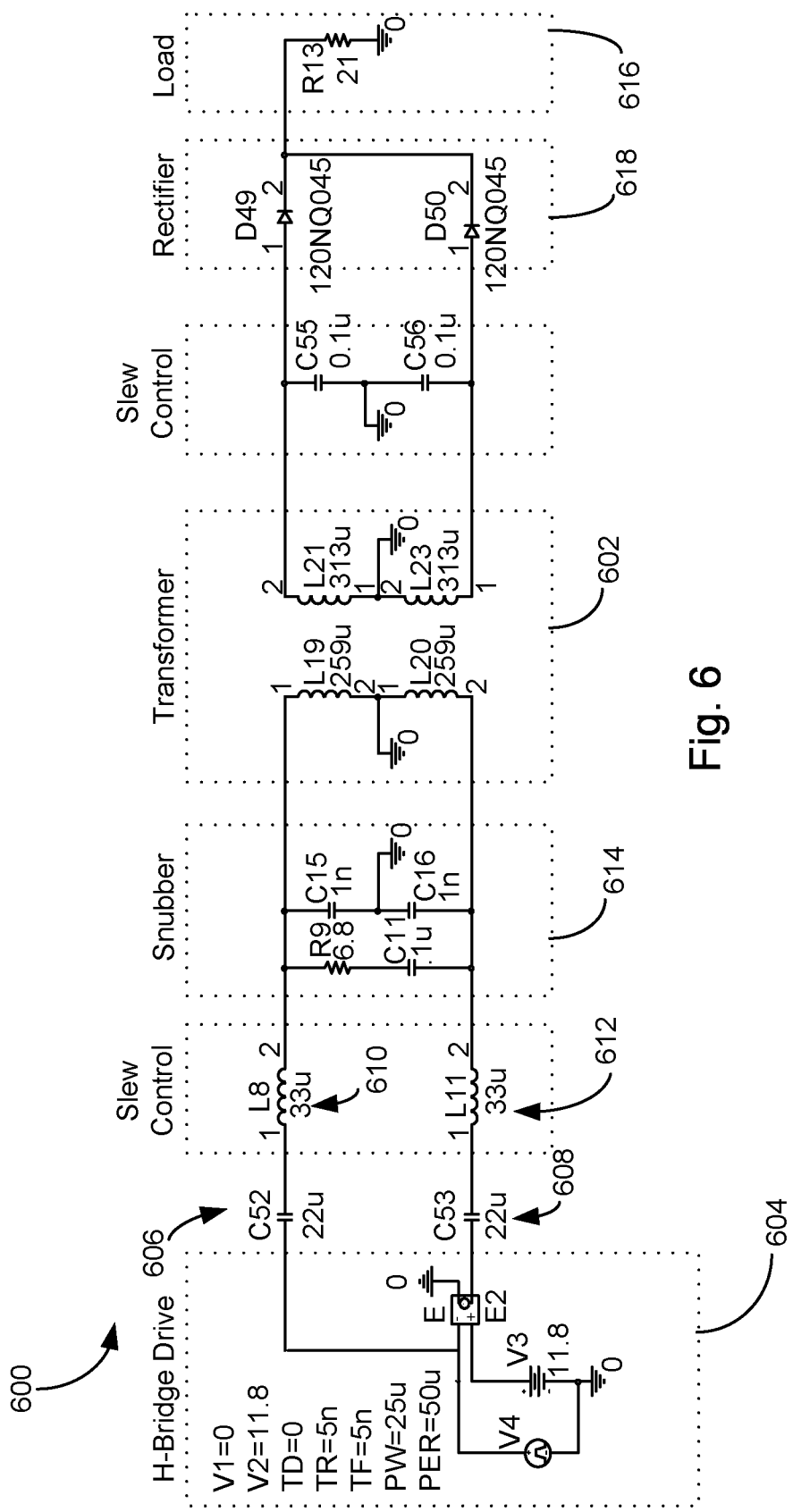
FIG. 6 is a schematic diagram for an isolation power supply incorporating another exemplary embodiment of a resonant converter.

FIG. 6 shows an another embodiment of a portion of an isolation power supply 600. Power supply 600 also employs a resonant converter for achieving low levels of injected current, while eliminating the need for closed loop control. Power supply 600 employs two H-bridges which are 180 degrees out of phase. As such, phase shift modulation is not needed.

To reduce injected current, a transformer 602 is again employed with low differential mode capacitance. The waveform used to drive the transformer 602 may be generated to have a slow slew rate such that 30-40% of the period is devoted to slewing. The H-bridge network (generally 604) will drive a square wave of a selected amplitude (e.g, 12 Vpk) on one of the differential lines while the other side is grounded. DC blocking caps 606, 608 are in series with the lines to prevent any common mode current from flowing through the transformer and slew rate limiting inductors 610, 612.

A snubber circuit 614 keeps the primary and secondary waveform from "ringing" which otherwise affect the injected current. Once the voltage on the secondary of the transformer exceeds the rectified voltage, current will begin to charge the load 616. By having a capacitive source presented to the diodes of rectifier 618, ringing that would otherwise occur with the leakage inductance of the transformer and the sharp turn-on times of the diodes is further eliminated. As such, the current being pulled through transformer 602 is rather constant, resulting in less distortion of the waveform.

Advantageously, this design does not require any feedback to regulate the supply voltages. Instead, the design relies on the fixed interaction of the slew rate control components to determine the output voltage at the desired current levels. This design is also highly efficient since the slew rate is controlled by the inductive and capacitive components which dissipate little power. Also, the snubber network can be minimized due to the capacitive load presented to the transformer. Finally, the differential drive advantageously limits the power loss within the transformer since the current draw is split between both cycles. As a result, this design is able to be implemented at a lower cost with a wider parts availability than alternative designs.

Figure 7:
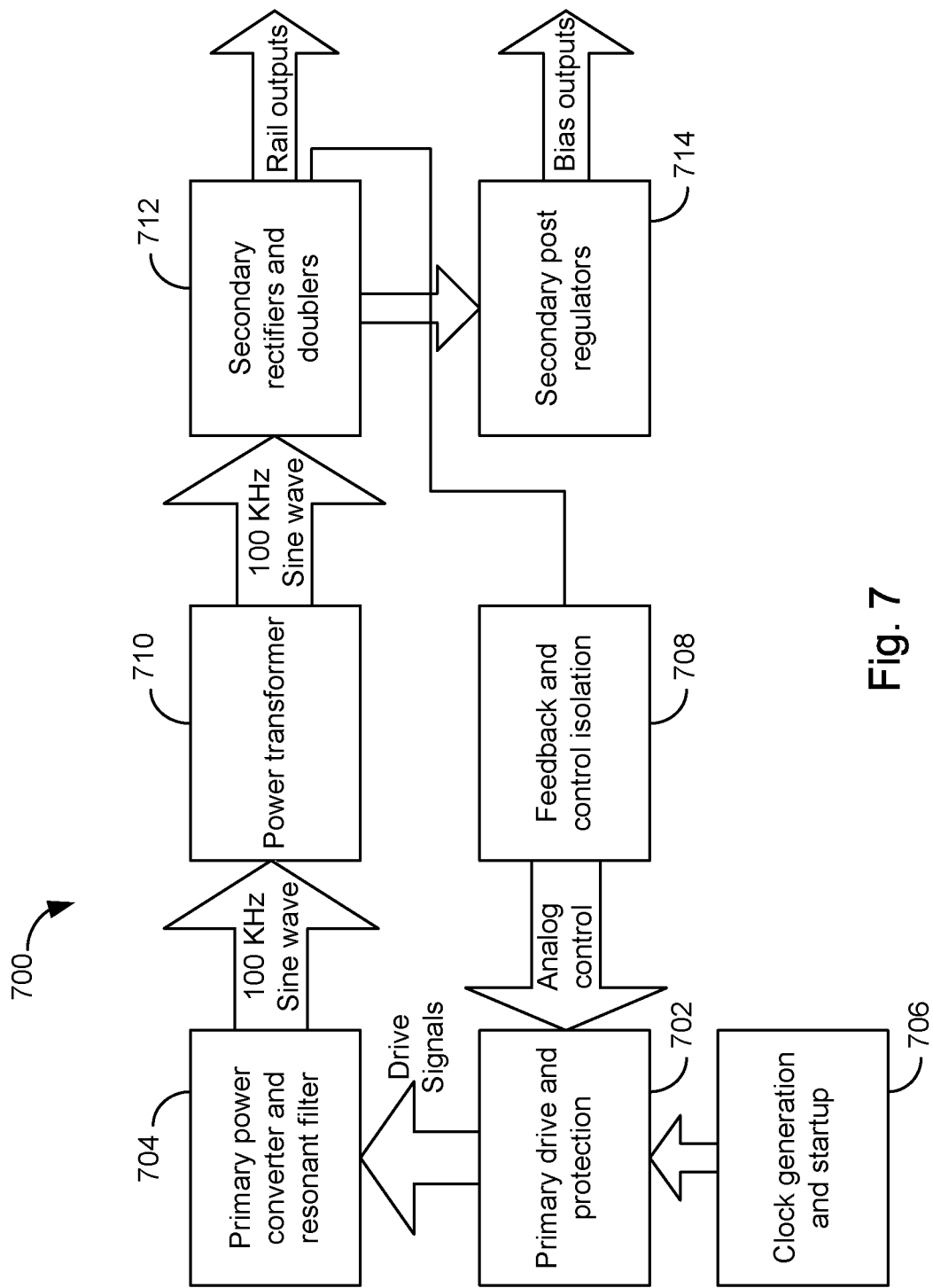
FIG. 7 is a block diagram of a system incorporating the described concepts.

With the above resonant converter arrangements in mind, a system is envisioned as depicted in the system block diagram 700 in FIG. 7. In system 700, a primary drive and protection component 702 produces the drive signals for a suitable resonant converter arrangement 704, such as described above. Component 702 is controlled by suitable clock generation and startup 706, as well as optional feedback and control isolation 708, as known in the art. Resonant converter 704 outputs a sine wave to a power transformer 710, such as described above. Power transformer 710 may then drive secondary rectifiers and doublers 712, as well as secondary post-regulators 714, as known in the art.

Figure 8:
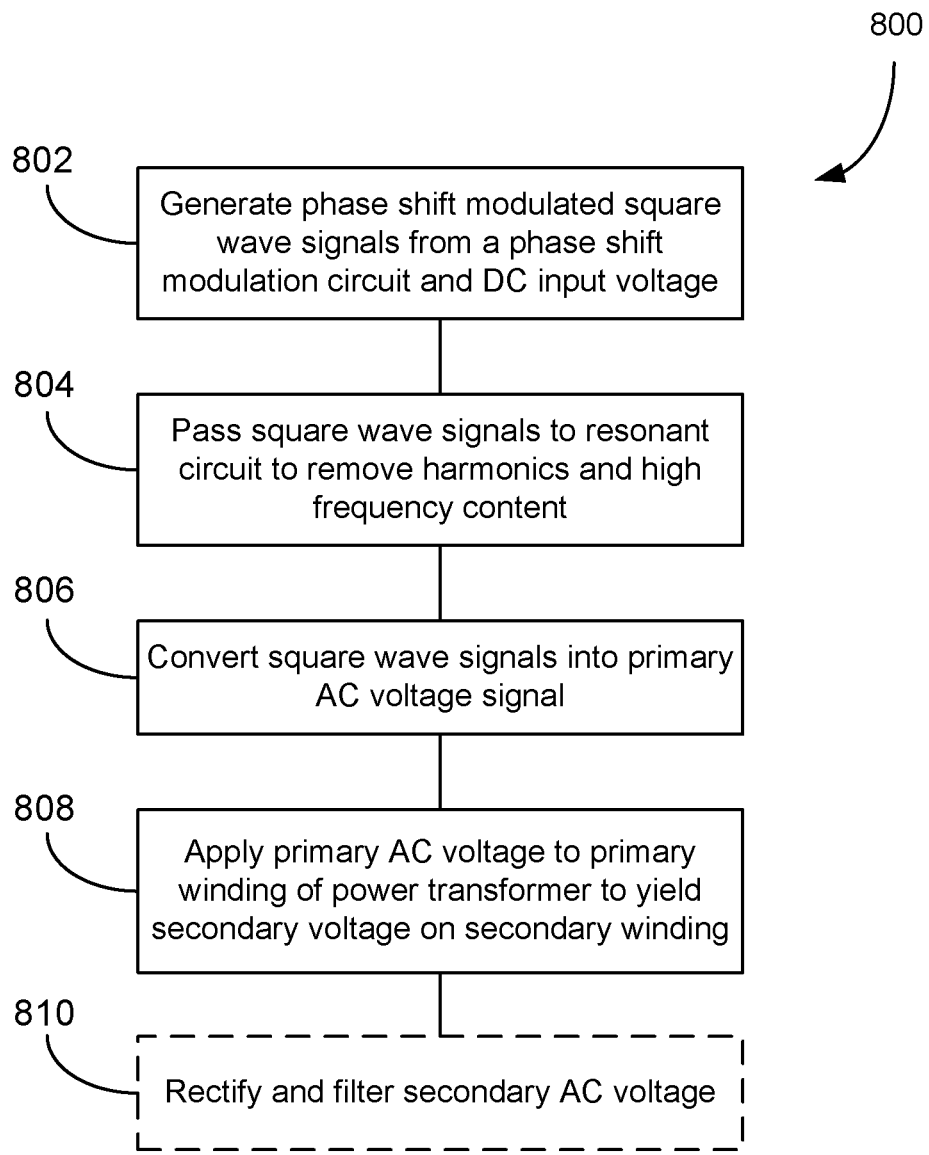
FIG. 8 is a flow diagram of a method for reducing common-mode current in an electronic device.

Also contemplated is a method 800 of reducing common mode noise, as illustrated in FIG. 8. Such a method may be employed in a suitable power supply, or any electronic device incorporating the same. According to method 800, a plurality of phase shift modulated square wave signals are generated at 802, such as from a phase shift modulation circuit and DC input voltage. The DC input voltage can be derived in a variety of ways, for example, from an isolated DC-to-DC converter. Further, the DC-to-DC converter may follow a traditional isolated power supply which converts AC line voltage to a DC voltage.

At 804 the square wave signals are passed to a resonant circuit to remove harmonics and high frequency content therefrom. The signals are converted into a primary AC voltage signal (VAGI) at 806. The primary AC voltage signal is applied to the primary winding of a power transformer such as described with reference to FIGS. 4a-b & 5a-c, to yield at least one secondary voltage on the transformer's secondary winding (step 808). Optionally, this secondary voltage may be rectified and filtered at 810.

Accordingly, the present invention has been described with some degree of particularity directed to the exemplary embodiments thereof. It should be appreciated, though, that the present invention is defined by the following claims construed in light of the prior art so that modifications or changes may be made to the exemplary embodiments of the present invention without departing from the inventive concepts contained herein.

What is claimed is:

1. An isolated resonant converter for achieving reduced common mode noise, comprising:
   an input signal source for generating at least one square wave signal;
   a resonant circuit driven by said at least one square wave signal for generating a primary alternating current (AC) voltage signal; and
   a transformer having a primary winding coupled to said resonant circuit, said transformer driven by the primary AC voltage signal to generate at least one secondary AC voltage at a secondary winding, and an exit on a primary side of said transformer tied to ground and aligned with an adjacent exit on a secondary side of said transformer to minimize voltage differential across an interwinding capacitance of the transformer.

2. An isolated resonant converter according to claim 1 wherein said input signal source includes a phase-shift modulated H-bridge driven by a DC input voltage for generating said at least one square wave signal.

3. An isolated resonant converter according to claim 2 wherein said H-bridge includes a first ½ bridge portion driven by the DC input voltage for generating a respective first square wave signal, and a second ½ bridge portion driven by the DC input voltage for generating a respective second square wave signal.

4. An isolated resonant converter according to claim 1 further comprising a rectifier configured to be driven by the secondary AC voltage to generate a rectified voltage, and a first low-pass filter configured to be driven by the rectified voltage to produce a DC output voltage.

5. An isolated resonant converter according to claim 1 wherein said primary AC voltage signal is sinusoidal.

6. An isolated resonant converter according to claim 1 further comprising a DC input voltage source configured to generate said DC input voltage.

7. An isolated resonant converter according to claim 1 wherein said resonant circuit behaves as a low-pass filter to reduce harmonic and high frequency content of said square wave signal.

8. An isolated resonant converter according to claim 1 wherein said resonant circuit includes an LC filter formed by a parallel arrangement of at least two inductors and a resonant capacitor, said resonant capacitor tying a primary side of said transformer to a common rail of the resonant converter.

9. An isolated resonant converter according to claim 8 wherein said LC filter has a single resonant frequency and operates to prevent current spikes from the input signal source from passing through to said transformer.

10. An isolated resonant converter according to claim 1 wherein said primary winding is wound in a direction opposite said secondary winding.

11. A power supply employing the isolated resonant converter of claim 1.

12. An electronic device employing the resonant converter of claim 1.

13. A method for reducing common mode noise in an electronic circuit, comprising:
   generating a plurality of square wave signals;
   passing said square wave signals into a resonant circuit that is operative to remove harmonics and high frequency content therefrom and convert said square wave signals into a primary alternating current (AC) voltage signal;
   applying said primary AC voltage to the primary winding of a transformer to yield a secondary AC voltage on at least one secondary winding of the transformer; and
   tying an exit on a primary side of said transformer to ground and aligning the exit with an adjacent exit on a secondary side of said transformer to minimize voltage differential across an interwinding capacitance of the transformer.

* * * * *